United States Patent [19]

Suzuki et al.

[11] Patent Number: 4,584,601
[45] Date of Patent: Apr. 22, 1986

[54] CIRCUIT PROVIDING GAMMA, COLOR AND TEMPERATURE COMPENSATION FOR THERMAL PRINTER

[75] Inventors: Masakuni Suzuki, Yokohama; Sadao Maeyama, Katsuura; Kiyoshi Arai, Higashikurume; Yoshio Kaneko, Chohfu; Shohgo Fujito, Tokyo, all of Japan

[73] Assignee: Sony Corporation, Tokyo, Japan

[21] Appl. No.: 532,843

[22] Filed: Sep. 16, 1983

[30] Foreign Application Priority Data

Sep. 20, 1982 [JP] Japan ................. 57-163637

[51] Int. Cl.⁴ .................... G03F 3/08; H04N 1/46
[52] U.S. Cl. ................................. 358/80; 358/75
[58] Field of Search ................... 358/80, 75, 78

[56] References Cited

U.S. PATENT DOCUMENTS

| | | | |
|---|---|---|---|
| 3,893,166 | 7/1975 | Pugsley | 358/80 |
| 4,399,749 | 8/1983 | Arai | 400/120 |
| 4,403,874 | 9/1983 | Payne et al. | 358/78 |

FOREIGN PATENT DOCUMENTS 13856  1/1982  Japan ................. 358/75

Primary Examiner—Michael A. Masinick
Assistant Examiner—Randall S. Svihla
Attorney, Agent, or Firm—Lewis H. Eslinger; Alvin Sinderbrand

[57] ABSTRACT

The color signals to be printed by a thermal color transfer printer are processed in order to provide gamma and temperature compensation for nonlinearities in the responses of the colored dyes used in the thermal printing ribbon and also to provide color compensation to correct for any overlap in the spectral response of these colored dyes. Color data signals are sampled and multiplexed to place the main or print color signal, which is determined by the color of the dye in position in front of the thermal head at that instant, in the center of a multiplexed, time-sharing arrangement with the non-print color signals arranged on either side. The multiplexed signal is digitized and used to address a read only memory containing compensation curves to provide both gamma compensation and color compensation, and the compensated signals are adjusted in gray scale magnitude before being pulse width modulated for driving the thermal head to produce the desired color, hard-copy print.

15 Claims, 22 Drawing Figures

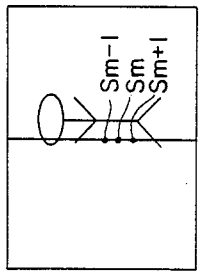
$$S_{m-1} = Y_{m-1} + M_{m-1} + C_{m-1}$$
$$S_m = Y_m + M_m + C_m$$
$$S_{m+1} = Y_{m+1} + M_{m+1} + C_{m+1}$$
FIG. 9
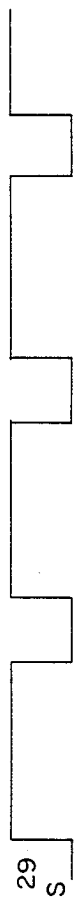
FIG. 8A  SAMPLE PULSES
FIG. 8B  MPX SW 33
FIG. 8C  AD 34
FIG. 8D  LATCH 36
FIG. 8E  LATCH 37
FIG. 8F  RIB
FIG. 8G  ROM 38A
FIG. 8H  LATCH 39

CIRCUIT PROVIDING GAMMA, COLOR AND TEMPERATURE COMPENSATION FOR THERMAL PRINTER

BACKGROUND OF THE INVENTION

1. Field of the Invention

The present invention relates in general to a thermal transfer image printer and, particularly, to a signal processing system for compensating for nonlinearities and spectral response characteristics of the colored dyes used in the thermal transfer printing ribbon.

2. Description of the Prior Art

With the advent of video tape recorders and other sources of video signals such as portable video cameras and the like, it has become desirable to be able to produce a full-color, hard-copy print of the image displayed on a television receiver or video monitor. Additionally, there has been recently proposed an electronic still camera that does not require photographic film but records signals representing the image on a magnetic sheet, the magnetic sheet then being played back for visual display of the still image on a television receiver or video monitor. It is very desirable that this electronic still camera be able to produce a full-color, hard-copy print from the signals recorded on the magnetic record. Thus, there have been proposed thermal-transfer, color-image printers, in which a thermal head having a number of energizable heating elements is used in conjunction with a ribbon or transfer film having several primary colored dyes individually applied to it. This ribbon having the colored dyes on it is arranged between the thermal head and a sheet of paper or similar medium and, upon excitation of the thermal head, the heat causes the dye to be transferred from the ribbon onto the paper. By scanning the magnetically recorded image signals and moving the paper and the ribbon in a corresponding fashion a full-color, hard-copy print may be produced from the magnetically recorded image.

In this proposed thermal printer, the image signals are arranged as in a conventional television display and one vertical column of the recorded image is printed at a time, thereby requiring the thermal head to have a number of heat elements corresponding to the number of horizontal scan lines making up one frame of the recorded video signal. In order to have realistic results, the color print produced must have a number of shades or densities of the various colors and combinations of colors provided by the colored dye ribbon. Therefore, the gray scale levels of the colors making up the recorded image must be accurately transferred to the print. While the circuitry to accomplish this is known, a problem arises in that the response of each of the dye colors is not linear over the full range of densities necessary to produce a realistic print. That is, the response of each color dye is linear for only a portion of the density curve, this linear portion is usually used to determine the slope of the response curve and is typically referred to as the gamma curve of the dye. Accordingly, when producing a color print with the thermal head and colored dye transfer ribbon it is necessary to compensate for the non-linearities in the dye response, and this is typically called gamma compensation.

Various systems have been proposed to provide gamma compensation, that is, to account for nonlinearities in the density response of the various colored dyes employed in the thermal transfer ribbon, and a further problem is presented in that the density-versus-wavelength response of the three primary color dyes employed in the ribbon are not separate and distinct. That is, there are overlapping portions in the response curves of the three color dyes, and the result of this overlapping is that some colors will appear to be overmodulated or exaggerated, because when that color is printed to its maximum density a portion of one or both of the other colors is printed to a lesser extent. Thus, while gamma correction is known in thermal transfer color printer a further problem is presented in that no color correction relative to the color dye response is available.

OBJECTS AND SUMMARY OF THE INVENTION

Accordingly, it is an object of the present invention to provide a signal processing system for use in a thermal color transfer printer, which provides color compensation for the dyes employed in the ribbon.

Another object of the present invention is to provide a signal processing system in which both color compensation and gamma compensation are performed at every picture element of a recorded color image.

A further object of the present invention is to provide a signal processing system in which color compensation is provided so that the gray scale levels of the signals applied to a thermal head to produce a full-color, hard-copy print of a recorded image are corrected to take into account the overlapping of the frequency response of the colored dyes employed.

In one aspect of the present invention color data signals are sampled and multiplexed so that the main color signal corresponding to the dye color on the ribbon in position between the thermal head and the print paper at that time is used to address a read only memory that contains tables of values to compensate for the response overlap, based upon the levels of the other color signals that are not to be printed at that time. The compensated signal from the read only memory is then latched into a random access memory where the address is correlated and the magnitude compared with gray scale levels. The signal is then pulse width modulated and used to drive the thermal head to produce the corresponding color print of the recorded still image.

The above and other objects, features, and advantages of the present invention will be apparent from the following detailed description of illustrated embodiments, which is to be read in connection with the accompanying drawings in which the same reference numerals identify the corresponding elements and parts in the several views.

BRIEF DESCRIPTION OF THE DRAWINGS

FIG. 8A shows sample pulses for timing certain operations performed by the block diagram of FIG. 6;

FIG. 8B through 8H show signals at various locations within the block diagram of FIG. 6; and FIG. 9 is a schematic diagram illustrating the orientation of a sampling line and the relative positions of successive sampling points along the sampling line.

DESCRIPTION OF A PREFERRED EMBODIMENT

Figure 1:
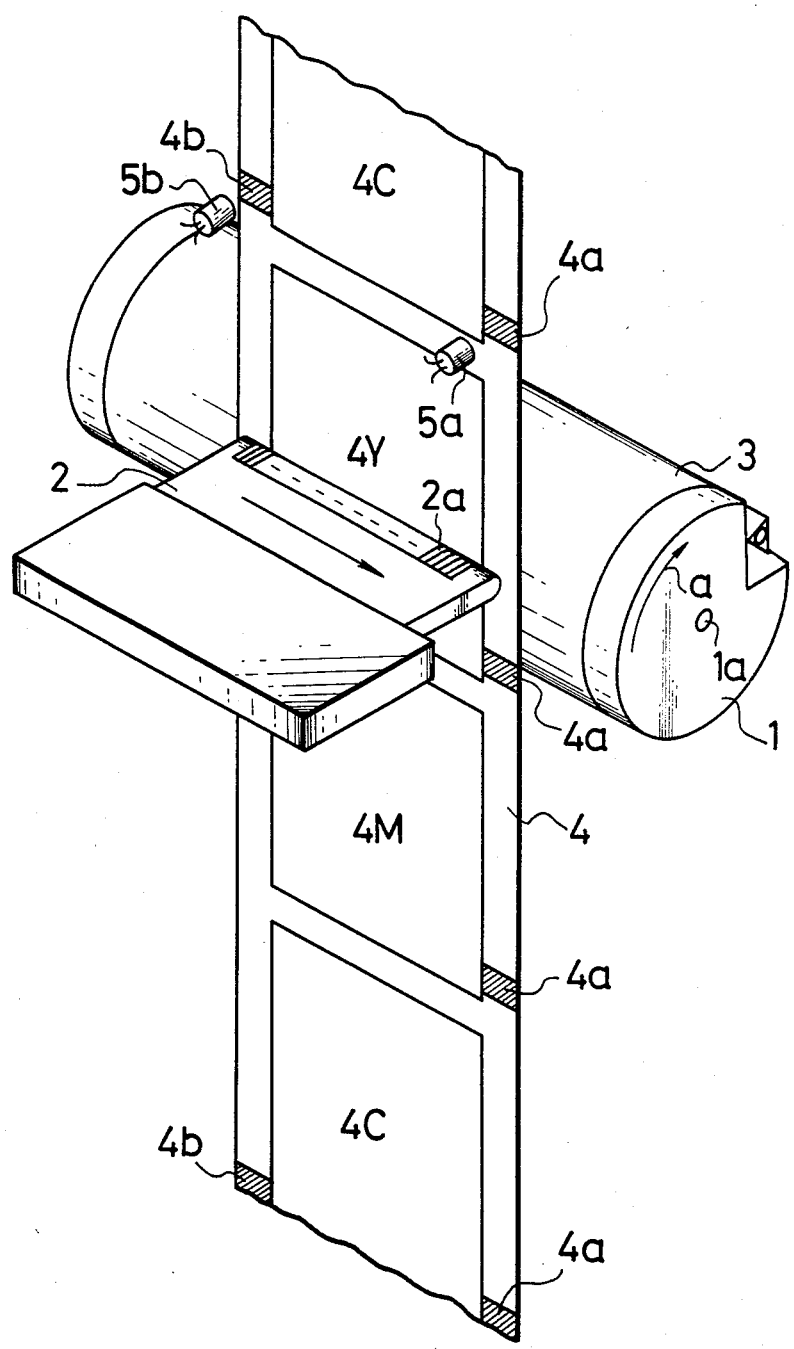
FIG. 1 is a perspective view of a color image printer of the thermal transfer kind.

FIG. 1 illustrates a portion of a system for transferring magnetically recorded image signals to a paper sheet to produce a full-color, hard-copy print of the recorded image. In FIG. 1, rotary platen 1 operates in conjunction with thermal head 2 such that a coated paper 3 is arranged around and firmly affixed to platen 1, the paper and platen then rotate about axis 1A in direction A. The platen 1 is driven in an incremental fashion by a motor (not shown), and the paper 3 upon which the print is to be produced is preferably a high quality paper that has coated thereon a high molecular resinous layer, for example a polyester resin, and such layer preferably has a thickness of approximately one to two microns. Arranged between thermal head 2 and paper 3 is an inked ribbon 4 that comprises a condenser paper upon which different colored dispersant dyes or sublimate dyes have been coated. Portions of the dispersant dyes that have been coated on the ribbon 4 are ultimately transferred to the print paper 3 by heat provided by thermal head 2 when it is energized by the magnetically recorded image signals. In order to obtain a full-color printed image, it is necessary to coat three distinct primary colors on ribbon 4 and, in the embodiment shown in FIG. 1, the subtractive primary colors yellow, magenta, and cyan are employed and are represented at frames 4Y, 4M, and 4C, respectively. The color segments 4Y, 4M, and 4C on ribbon 4 all correspond to the same frame of the picture to be printed. Thus, platen 1 would be rotated one complete revolution for each of these three primary color segments, the thermal head 2 activated, and the three colored dyes superimposed, one on the other, in the appropriate locations in producing an image on print paper 3.

The thermal head typically employed in this embodiment has a large number of heat elements, one of which is shown typically at 2A, arranged adjacent one another in a row. These heat elements 2A correspond to recorded picture elements in a vertical column perpendicular to the horizontal scan lines, which would form a picture on a cathode ray tube in a television receiver. Thus, it is advantageous to provide a plurality of heat elements 2A that correspond to the number of horizontal scan lines typically used to form one frame in a video display. For example, in the NTSC format there would be up to 525 heat elements 2A, whereas in the CCIR format there would be up to 625 heat elements 2A.

In operating the apparatus of FIG. 1 to produce a full-color print, the signals of the original image retained in the magnetic storage are sampled at positions corresponding to the picture elements in one column of the picture that would appear on a cathode ray tube display. Such sampling is carried out at positions that are in-phase with the horizontal sync signals of one frame. Then, as the image is developed, the sampling position is sequentially shifted by a predetermined amount from one end to the other end of the picture in the horizontal direction. In this fashion, the entire original color signal making up the video frame is sampled. As the sampling of the frame progresses, column by column in the horizontal direction, colored dye ribbon 4 that is arranged in contact with printing paper 3 and the thermal head 2 is similarly moved in a step-wise fashion together with paper 3 affixed on rotary platen 1. The extent of the incremental rotary motion imparted to paper 3 and the linear incremental motion imparted to the inked ribbon 4 correspond to the distance between adjacent sampling positions of the vertical columns in the video frame.

As indicated, the three primary dye colors that are employed to provide the full-color printed image are arranged on the ribbon so that they can be superimposed one upon the other and, in that regard, when the segment of yellow dye 4Y of inked ribbon 4 is facing printing paper 3, the signal Y corresponding to the yellow component is derived from each sampled value of the picture elements of one vertical column of the original color signal. This signal Y is converted to a pulse width modulation signal and fed to drive the heat elements 2A of thermal head 2. Accordingly, when the level of the yellow signal Y is high, the pulse width will be large, thereby increasing the transferred density of the yellow dye and providing a more intense color image, that is, one having a higher gray scale level. When the transfer of the yellow color image components of that particular vertical column of picture elements in the video screen image is completed, the rotary platen 1 is incremented by a step, the ribbon 4 is advanced a step, and the thermal transfer of the yellow component is then carried out for the next vertical column of picture elements in the video screen image. All of the elements in this next column are similarly sampled, pulse width modulated, and fed to the heat elements 2A for transfer of the yellow color portion of the image to the paper 3. This continues until all of the vertical columns have been sampled, for that color, and an identical operation takes place for the remaining two color segments of ribbon 4, with platen 1 being rotated for each color.

Thus, in many locations the transferred image of the magenta component will be superimposed upon the transferred image of the yellow component and the transferred image of the cyan component, so that all images are in register. This will produce a full-color printed image corresponding closely to the original color picture retained in a memory or magnetic record.

In order to synchronize and coordinate all of these operations, a color frame detection mark 4a and a color set block detection mark 4b are provided at specfic locations on ribbon 4, relative to the color dye frames 4Y, 4M, and 4C. Synchronization of the color frame and color set block utilizing markers 4a and 4b is established by photo sensors 5a and 5b, respectively.

While use of the three primary color dyes on ribbon 4, as described above, provides a full-color printed image, it is also possible to add a frame of black dye to ribbon 4 to improve the resultant printed image quality.

It is to be understood when printing the individual colors that such colors have variations of tone or intensity depending upon the gray scale levels of the color image. Further, it is to be understood that these gray scale levels, which correspond to essentially the response characteristics of the dyes utilized in the ribbon 4 and, specifically, to the response relative to input levels and resultant printed image densities, do not vary linearly relative to the changes in the input signal; that is, the curve between the minimum density of an image element printed on the paper and the maximum density of an image element printed on the paper when the input signal is permitted to vary over its allotted range does not slot as a straight line. Nevertheless, this density-versus-input response characteristic can have a certain slope ascribed to the curve and, typically, this slope is referred to as the gamma. In fact, for the purposes hereof the entire response curve may be referred to as the gamma characteristic of the particular colored thermal transfer dye. Such nonlinearities in the gamma characteristic must therefore be corrected or compensated in order to produce natural colors over the range of possible gray scale levels.

Figure 2:
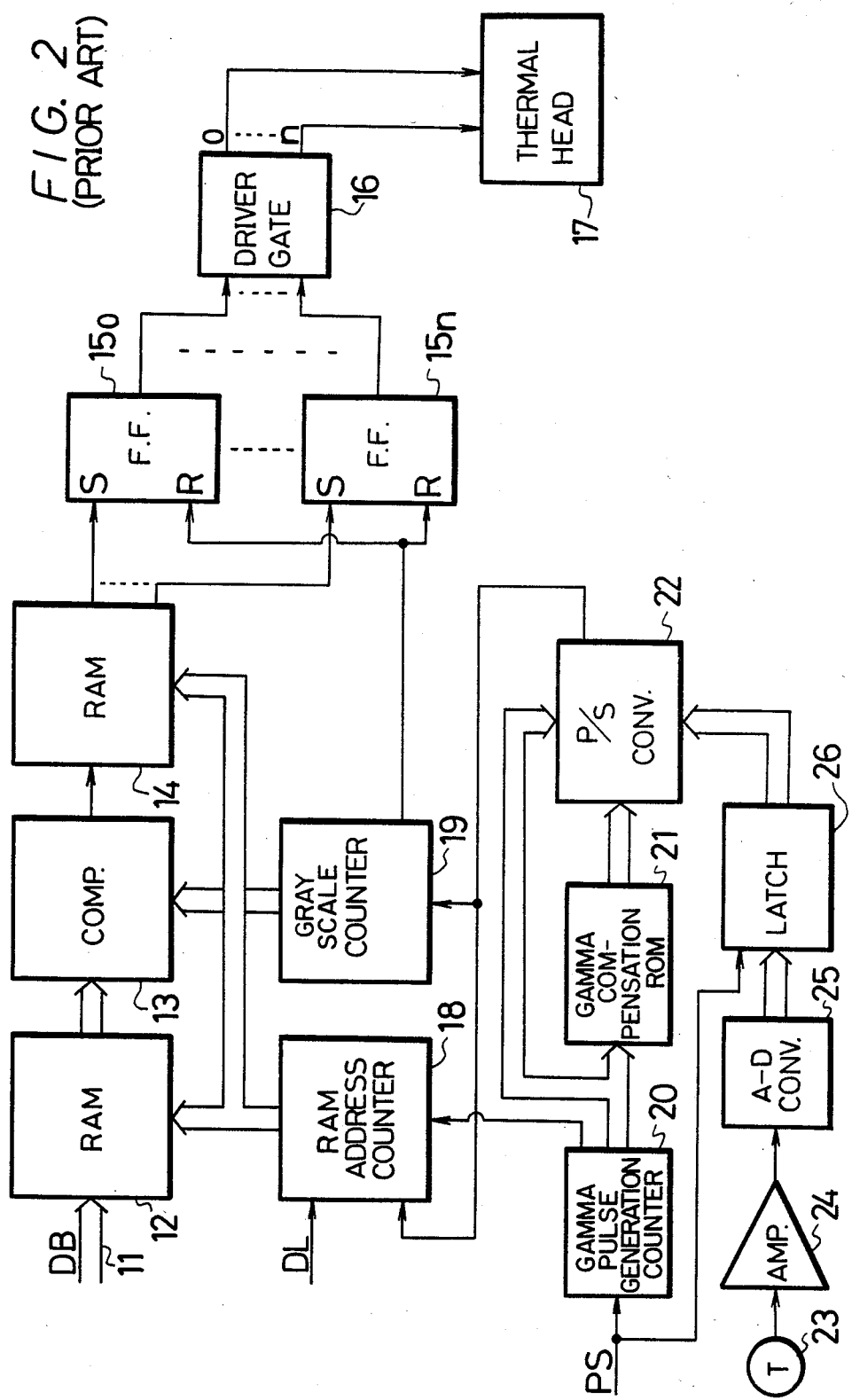
FIG. 2 is a block diagram of a monochromatic signal processing system for use with the printer of FIG. 1 that can perform gamma compensation but which can not provide color compensation.

Referring now to FIG. 2, a system is shown that provides gamma correction for the nonlinear transfer characteristics of the various color dyes used in this thermal printer, and while the system shown in FIG. 2 is one which would produce a monochromatic printed image, it can be easily expanded to produce a full-color printed image.

The digitized monochromatic image signal is fed in on data bus 11 from a suitable micro-processor, specifically, from the central processing unit thereof (not shown), and the digitized image signal data is fed to buffer random access memory (RAM) 12, where it is temporarily stored. This data will be ultimately pulse width modulated and utilized to drive the thermal printing head and, in that regard, thermal head 17 is arranged to be driven by a number of signals corresponding to the number of individual thermal heat units contained in thermal head 17. These signals are produced by driver gate 16 that is connected to be driven by a number of flip-flops $15_O$ to $15_N$, with the number of flip-flops corresponding to the number of heat elements (N+1) contained in thermal head 17. It is flip-flops $15_O$ to $15_N$ that produce the pulse width modulation signals corresponding to the various gray scale levels of the individual sampled picture elements, and the outputs from flip-flops $15_O$ to $15_N$ are supplied through the individual gates of driver gate 16 to the corresponding heat elements of thermal head 17.

Figure 3:
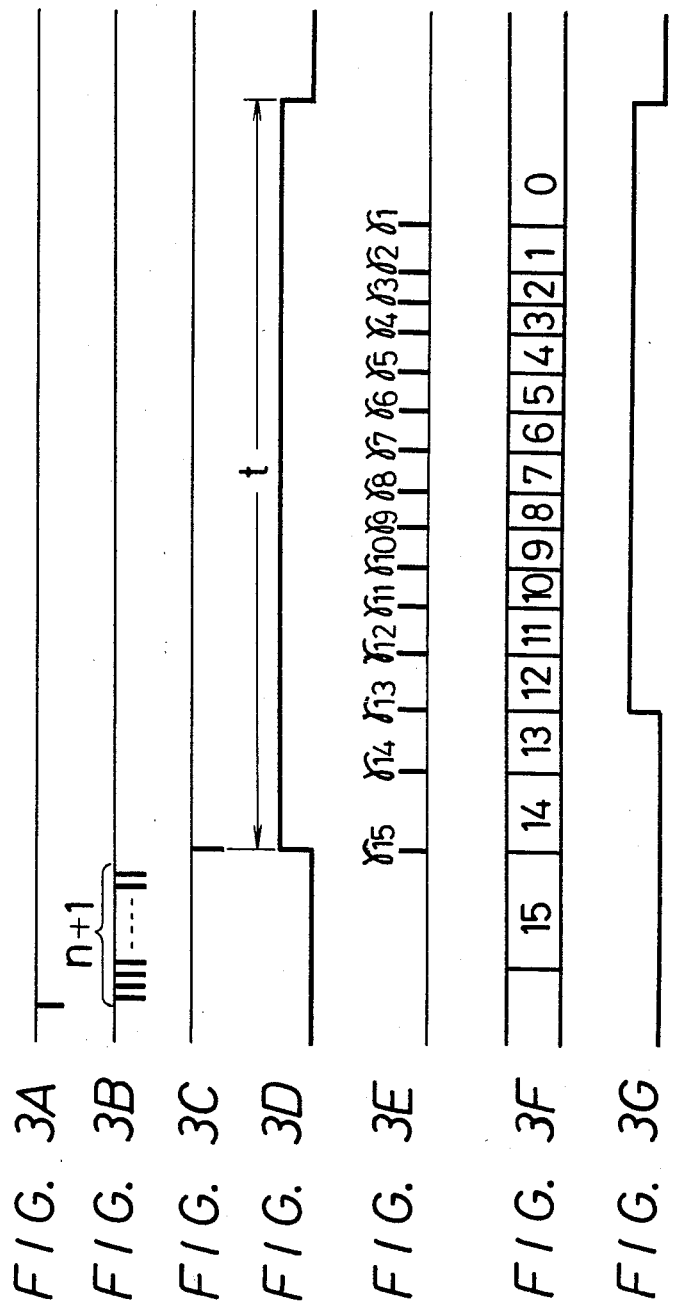
FIGS. 3A to 3G are waveform and pulse diagrams useful in explaining the operation of the signal processing system of FIG. 2.

In such printing operation, flip-flops $15_O$ to $15_N$ are first reset by a drive clear signal as might be produced by the processor (not shown), and a typical drive clear signal is shown in FIG. 3A. After the flip-flops $15_O$ to $15_N$ have been cleared, the sampled value of the digitized image signal of one vertical column on the picture screen is fed through data bus 11 and stored in RAM 12 by command of a data latch signal DL, also produced by the processor, fed to a random access memory (RAM) address counter 18. A typical waveform of a suitable data latch signal is shown in FIG. 3B. Once the entire vertical column of picture elements has been stored in buffer RAM 12, a print start signal PS, also produced by the processor, fed to gamma pulse generation counter 20 will permit the printing of the picture elements of the particular column. A typical waveform of a suitable print start signal PS is seen in FIG. 3C.

More specifically, when the print start signal PS is present, gamma pulse generation counter 20 commences generation of a pulsed signal fed to gamma compensation read only memory (ROM) 21 that performs compensation for the gamma characteristic of the specific color dye being printed. At that time, a print flag is internally raised in parallel-to-serial convertor 22 that then produces a gamma pulse signal fed to counter 19. Although the print flag is internal to parallel-to-serial convertor 22, its waveform is represented at FIG. 3D, and the gamma pulse signal is represented at FIG. 3E. The number of pulses in the gamma pulse signal in FIG. 3E corresponds to the number of gray scale levels during the printing time of the vertical column of picture elements by the thermal head 17. In other words, the number of pulses in the gamma pulse signal corresponds to the intensity of the color to be printed, as determined by the gray scale level signal. In a case where there are sixteen gray scale levels, then there are a corresponding fifteen gamma pulses extending from pulse $\gamma 15$ to pulse $\gamma 1$, as in FIG. 3E. Thus, the count values in counter 19 correspond to the gamma-compensated gray scale levels and are accordingly counted down in turn from gray scale level 15, as represented in FIG. 3F.

Simultaneous with the arrival of the print start signal PS at gamma pulse generation counter 20, pulse $\gamma 15$ from parallel-to-serial convertor 22 is fed to counter 19 and also to RAM address counter 18, for addressing the buffer RAM 12 that contains the column of picture element data. Then, in response to the address signal from RAM address counter 18, the sample data of the one vertical column, that is, the N+1 samples, are read out from RAM 12 to digital magnitude comparator 13. During that time the data counted in counter 19, which corresponds to the gray scale level fifteen, is fed from counter 19 to digital magnitude comparator 13, wherein it is compared with the sampled data from buffer RAM 12. If the sampled data from buffer RAM 12 is at a level higher than the gray scale level fifteen produced by counter 19, then the output from digital magnitude comparator 13 is a "1" for that sampled data. Accordingly, among flip-flops $15_O$ to $15_N$, the flip-flop corresponding to the address specified by RAM address counter 18 is then set by the data from data buffer RAM 14. This procedure is applied to all of the N+1 sampled data bits such that all of the pulses are scanned over all of the gamma pulses and the corresponding flip-flops are set in accordance with the level of each sampled data. The flip-flop outputs then drive the appropriate drive elements in the driver gate 16 to energize the corresponding heat element in thermal head 17, during the period that the drive gate output signal is at level "1".

There is a time t that is determined by the parameters of the thermal head 2, the ribbon 4, and the paper 3 at which maximum density or color intensity on the printing paper will be achieved, this time is represented in FIG. 3D, and upon reaching such time the print flag in the parallel-to-serial convertor 22 is reset. The flag period is similarly carried out for each of the picture elements contained in the particular vertical column to be printed and, similarly, all of the flip-flops $15_O$ to $15_N$ are reset. This operation is carried out for each of the vertical columns that make up the complete video frame.

Therefore, the outputs of the several flip-flops $15_O$ to $15_N$ high (become "1") or remain low ("0") in accordance with the gray scale of each of the data elements, and a typical case is represented in FIG. 3G. It is during the time when the flip-flop output is high that printing is performed by the corresponding head element and, thus, flip-flops $15_O$ to $15_N$ generate the pulse width modulation (PWM) signals by which thermal head 17 is driven. Moreover, because the gamma pulses used to generate the pulse width modulation signals are generated in dependence upon, and in accordance with, the particular gamma characteristics of the specific color dye used in the inked ribbon, the appropriate gray scale relationships can be obtained in the resultant hard-copy print.

Figure 4:
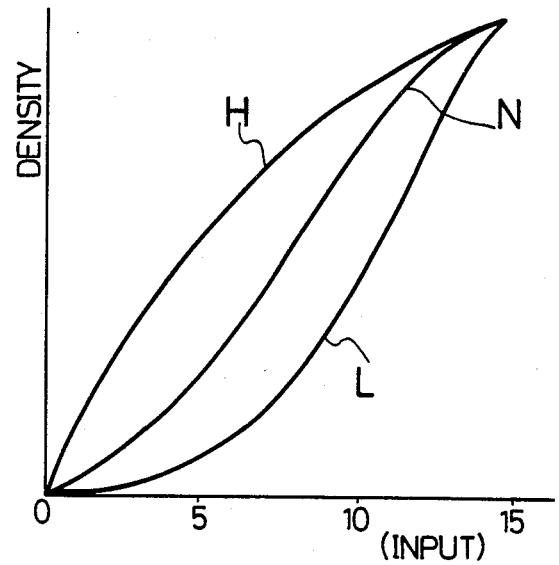
FIG. 4 is a graph representing the density-versus-input level response of a colored dye at different selected temperatures.

Additionally, the gamma characteristics of the colored dyes vary in response to the ambient temperature and, as represented in FIG. 4, the gamma characteristic curve H, which corresponds to a higher ambient temperature than standard, has higher values of density for the same input levels and has a different curve shape than the normal or standard ambient temperature curve N. Similarly, when the ambient temperature of the color dye on ribbon 4 is lower than standard, the corresponding gamma characteristic curve L is lower as well. Accordingly, simply compensating or correcting the gamma characteristic and assuming that the ambient temperature is at a standard temperature may not result in a print having the correct gray scale levels and, thus, it is desirable to provide multiple gamma characteristic curves corresponding to ambient temperatures above and below the standard or normal temperature. In the embodiment shown in FIG. 2, gamma compensation ROM 21 includes tables for providing gamma compensation at not only standard temperatures but also at ambient temperatures above and below the standard. The parallel-to-serial converter 22 is therefore provided with an internal multiplexer (not shown) to select the appropriate one of these three converting tables.

As a means of determining actual ambient temperature, temperature sensor 23 produces a temperature output signal that is level controlled in amplifier 24 and converted to a digital value in analog-to-digital converter 25, with the resultant digital temperature value being fed to latch circuit 26. The output of the latch circuit 26 is then fed to the multiplexer (not shown) of parallel-to-serial convertor 22, which is controlled to generate a gamma pulse that is corrected based upon the converting table corresponding to the sensed ambient temperature. This temperature data is latched into latch circuit 26 by the print start signal PS, so that the same temperature information is provided for the picture elements of all vertical columns of the video frame as the vertical columns progress across the frame in the horizontal direction.

Figure 5:
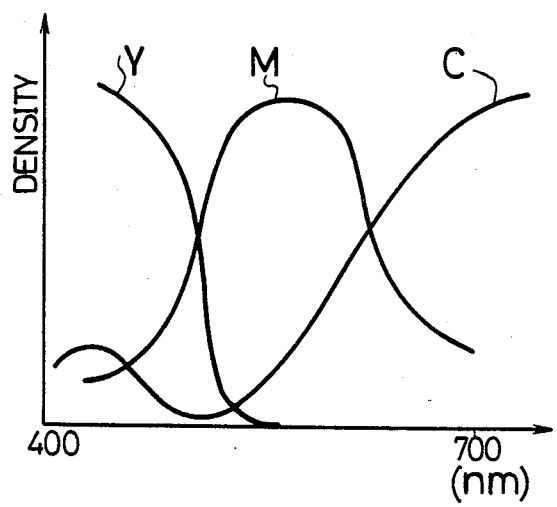
FIG. 5 is a graph of density-versus-wavelength response curves of primary colored dyes utilized in a thermal printer of the kind shown in FIG. 1.

Based upon the above description of the circuit of FIG. 2 it is seen that the gamma characteristic of a color printing dye can be compensated for in a generalized circuit; however, when such gamma compensation system is applied to the full-color thermal printer various disadvantages become apparent, and the principal disadvantage is caused by the fact that the density-versus-wavelength responses of the several color dyes, yellow, magenta, and cyan, are not independent. Referring to FIG. 5, it seen that the three primary color components are not completely independent and that the response curves of these three colors overlap at the extreme ends. For example, if yellow and magenta are to be printed at their maximum densities, and the yellow component is printed at its maximum density following printing of the magenta component at its maximum density, the yellow component that is present at the shorter wavelength end of the magenta response curve is added to the maximum density yellow component, resulting in an over-emphasis or extreme yellow image by the amount contained in the shorter wavelength portion of the magenta response curve. The present invention recognizes this disadvantage and provides a means whereby the yellow component is printed on the paper at a density that anticipates the extent of the yellow component contained in the magenta component. In other words, the present invention provides color compensation in addition to the gamma compensation for each of the primary colored printing dyes.

One approach to solving this problem which might be apparent from the system of FIG. 2 is to perform both gamma compensation and color compensation in the gamma compensation ROM 21. Nevertheless, it is impossible to perform both gamma compensation and color compensation in ROM 21 because color compensation is necessary for each of the individual sampled data bits, whereas the data stored in the gamma compensation read only memory 21 is changed only in units of vertical columns of the video picture. Thus, individual data bit color compensation is impossible using the circuit of FIG. 2, since the rate of change of the corresponding data elements is insufficient in relation to the gamma compensation ROM 21.

Figure 6:
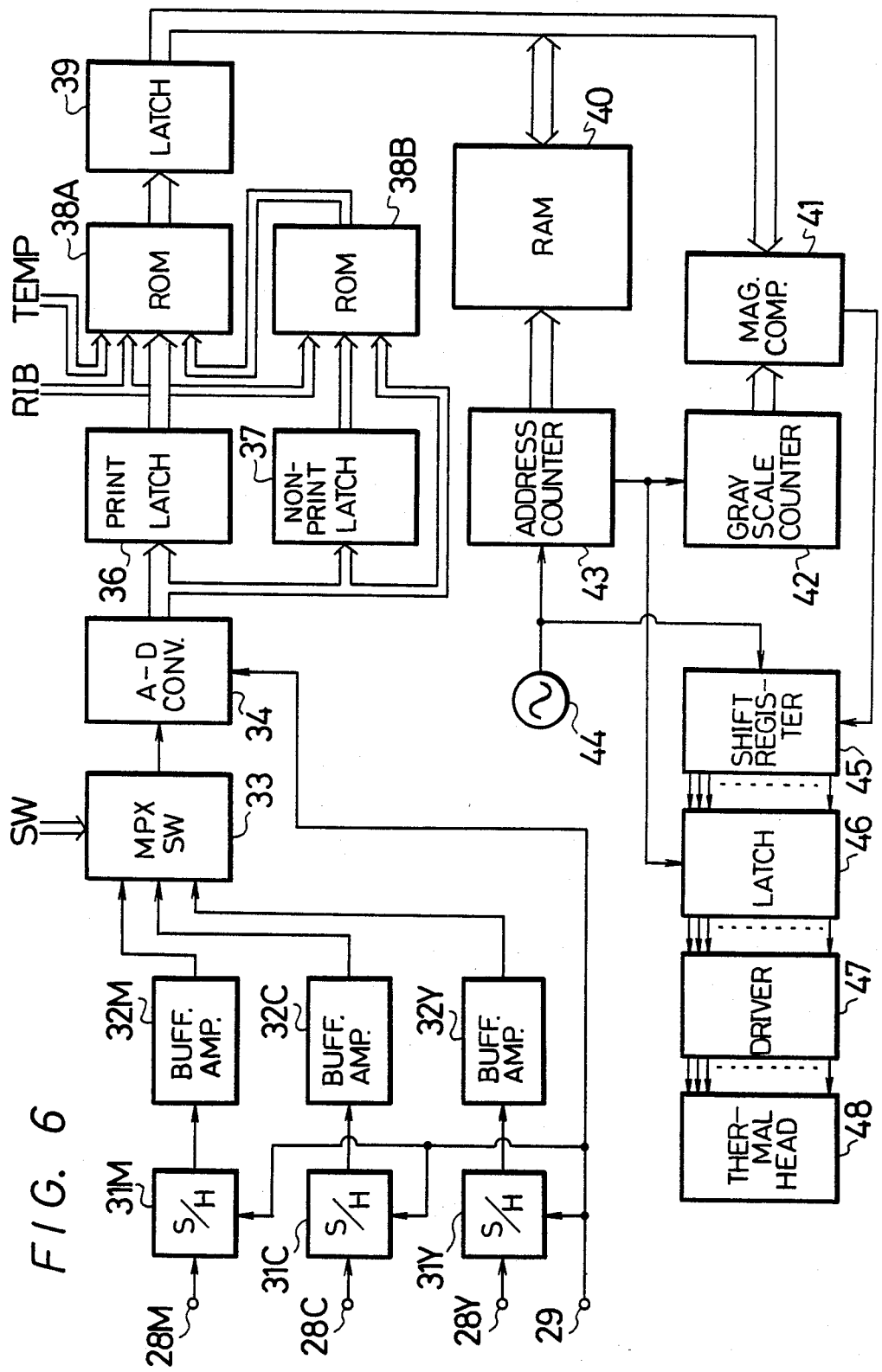
FIG. 6. is a block diagram of a full-color signal processing system for providing gamma compensation and color compensation according to the present invention.

Referring then to FIG. 6, an embodiment of the present invention providing both color compensation and gamma compensation is shown, in which the primary color signals corresponding to the primary colors, magenta, cyan, and yellow, are fed in at terminals 28M, 28C, and 28Y, respectively. Each of these primary color signals has been separated or derived from a still color image generated from a signal source (not shown) as an original color image. These primary color signals are fed to sample-and-hold circuits 31M, 31C, 31Y in which the picture elements of one column of the video screen image are sampled in accordance with a sample pulse signal applied at terminal 29 and fed to each of the sample-and-hold circuits. Subsequently, the sampling position thereof is shifted in the horizontal direction at the frame or field rate of the image signal. The sampled values of the primary color signals M, C, and Y for each picture element are supplied, respectively, through buffer amplifiers 32M, 32C, and 32Y to multiplexer 33. In multiplexer 33 the three color signals are arranged in a time-sharing fashion by a signal SW applied to multiplexer 33, which can be derived from the central processor unit (not shown), and the three color signals are arranged depending upon the color of the portion of the inked ribbon in front of the thermal printing head at that time. For example, the color signal component corresponding to the color of the ink ribbon arranged in front of the thermal head being printed at that time is thought of as the main or print signal and is placed in the center by multiplexer 33. The other two color signal components are thought of as non-print signals and are arranged at either side of the main color signal component by multiplexer 33. Thus, the three color signals that have been so arranged by multiplexer 33, in response to signal SW, are fed to analog-to-digital convertor 34 where they are converted to a digital signal. The digital signal produced by analog-to-digital convertor 34 is fed to print latch circuit 36 and to non-print latch circuit 37 and also to a compensation read only memory (ROM) 38B, where it is used as a portion of the address information for compensation read only memory (ROM) 38A.

Latch circuit 36 is a print latch and stores the color digital signal that has been multiplexed and arranged in the center, that is, the main signal that is to be printed, and this main signal is fed out of print latch 36 to compensation ROM 38A, also as part of the address information therefor. Non-print latch 37 stores the first color signal that was multiplexed in relation to the main signal and this non-print signal is fed from non-print latch 37 to compensation ROM 38B, as part of the address information therefor. An information signal RIB that indicates the color of the dye in the segment of the inked ribbon currently arranged between the thermal head and the paper is fed to compensation ROMs 38A and 38B, and also forms part of the address information contained therein. The compensation ROM 38A produces a digital output signal that results from data converting (converting in level) the main signal based upon the levels of the non-print signals relative to the main print signal, in accordance with the address information that is fed thereto.

FIG. 8A shows sample pulses supplied to the terminal 29 (FIG. 6) to time the sample-and-hold circuits 31M, 31C, 31Y and the analog-to-digital converter 34. The pulses 29 have a repetition rate equal to the repetition rate of the horizontal sync signal (15.75 KHz for example).

FIG. 8B shows the case where the magenta components are printed: i.e., the selected color data signal which is the basis of the digital print signal corresponds to the magenta components in the image to be reproduced. Accordingly, in the multiplexer 33, the sampled analog signal components $Sm-1$, $Sm$ and $Sm-$ (FIG. 9) are arramged as $Ym-1$, $Mm-1$, $Cm-1$; $Ym$, $Mm$ and $Cm$; $Ym+1$, $Mm+1$, $Cm+1$..., the signal representing the magenta components being arranged in the middle. These signals are converted in the analog-to-digital converter 34 (FIG. 6) to digital form and are shown in FIG. 8C.

The print latch 36 stores the magenta data, as shown in FIG. 8D, while the non-print latch 37 stores the data for one of the other colors, for example the yellow data, as shown in FIG. 8E. The signal RIB (FIG. 8F) indicates that magenta is the color then being printed.

While cyan data $Cm-1$, $Cm$, $Cm+1$ are being obtained at the output of the analog-to-digital converter 34 (FIGS. 6 and 8C), corrected magenta data are being obtained at the output of ROM 38A (FIGS. 6 and 8G) and latched in the latch 39 (FIGS. 6 and 8H and then sequentially stored in the RAM 40.

Figure 7:
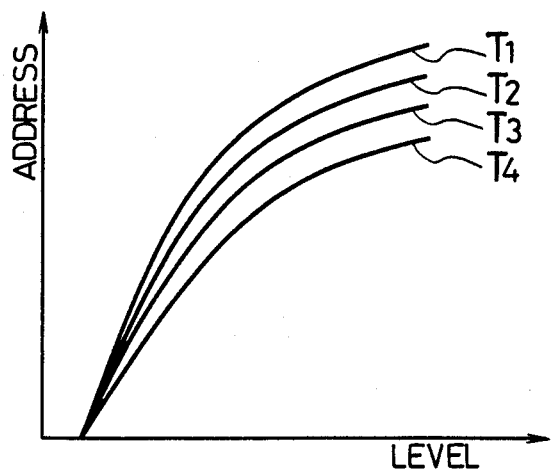
FIG. 7 is a graph of data compensation curves contained in a compensating read only memory in the embodiment of FIG. 6.

Gamma compensation of the printing dye is performed in the system of FIG. 6 by providing compensation ROM 38A with a plurality of conversion tables designated as $T_1$, $T_2$, $T_3$, and $T_4$, which are represented by the curves in FIG. 7, and that are associated with the colors of the inked ribbon and the relative levels of the non-print signals. The curves of FIG. 7 correspond to data which modifies the address within the ROM 38A from which the compensating data is read out. The color response curves of FIG. 5 are based to a large extent upon the specific dyes that are employed in making the inked ribbon, for example, there is no absolute value of yellow that will always be contained in a magenta color signal. One of the converting tables, $T_1$, $T_2$... $T_i$ is selected by the information signal RIB and the output from non-print compensation ROM 38B, such that the main or print signal from print latch 36 is level converted. Accordingly, non-print compensation ROM 38B is provided with a plurality of converting tables that are associated with the various combinations of the two colors that correspond to the non-print color signals. One of the above converting tables is selected by the color information signal RIB relative to the ink ribbon color, and the signal for selecting a predetermined converting table in print ROM 38A from the information of two colors is delivered from the non-print ROM 38B.

The main signal produced by print compensation ROM 38A is then stored in latch circuit 39 and subsequently written into random access memory (RAM) 40. These main signals are continued to be read into RAM 40 until all of the picture elements of the column of the video frame have been sequentially written into the memory. Once all of the picture element information of the vertical column is stored in RAM 40, a print start signal is supplied by a central processing unit (not shown) in the fashion described above, and the thermal head 48 is ultimately driven by the pulse width modulated signals.

The respective sampled main or print signals from RAM 40 are fed to magnitude comparator 41 in accordance with output data from address counter 43. In magnitude comparator 41 the pulse width modulated signals are generated by comparing the sampled main signals from RAM 40 with digital signals output from a gray scale counter 42, for example, digital signals representing sixteen gray scale levels. Then, an output becomes "1" at the time corresponding with the gray scale level is produced from magnitude comparator 41 and is fed to shift register 45, which has a capacity determined by the number of heating elements in the thermal head 48. In shift register 45 the output signal from the magnitude comparator 41 is converted from serial to parallel form and is stored in a corresponding latch circuit 46. This procedure continues for all sampled main or print signals of the picture elements contained in the vertical column, as represented by the data stored in random access memory 40, and the pulse width modulated signal corresponding to the gray scale levels appears at each output of latch circuit 46 and is subsequently fed through driver circuit 47 to the corresponding heat element of the thermal head 48. The address counter 43 that produces the addresses fed to random access memory 40, as well as a sync signal to gray scale counter 42 and latch 46, is driven by clock pulses produced by clock pulse generator 44. Thus, is accordance with the embodiment of FIG. 6, color compensation and gamma compensation are performed at every picture element in every vertical column that makes up the video frame of the picture, thereby producing a full-color, accurate print of the recorded video signal.

In other aspects of the present invention, in place of the print and non-print compensation ROMs, 38A and 38B, a single large scale read only memory could be substituted, in which case, the information signal (RIB) relative to the color of the ink ribbon segment and the three color signals are then all provided to this single read only memory as the appropriate address information, and such read only memory then contains a plurality of converting tables based upon the known nonlinearities and response curve overlaps, in order to obtain the desired gamma compensation and color compensation, respectively. Moreover, the present invention makes accommodations for the receipt of data indicating the ambient temperature of the dye supplied as address information by signal TEMP to compensation ROM 38A, thereby also providing temperature compensation. The converting tables used in the compensation read only memories can also be constructed to compensate for reverse color transfer to the inked ribbon, that is, compensation for the amount of ink of one color transferred back to the inked ribbon during printing of another color. In another aspect of the invention, it is also possible that in addition to supervising the input information, such as at terminals 28M, 28C, and 28Y, the central processing unit (not shown) can be employed to form converting tables in the random access memory itself.

Moreover, while the color compensation circuitry has been described in relation to a thermal transfer color image printer, the color signal processing circuitry of the present invention should not be so limited and can be equally applicable to other color image printers. Also, while the embodiment of FIG. 6 is directed toward a color image printer in which any one of various number of gray scale conditions can be represented, the invention need not be so complicated and can be similarly applied to a color image printer that provides binary color images, in which each of a plurality of colors is either present at full intensity or not at all.

Although illustrated embodiments of the present invention have been described in detail above with reference to the accompanying drawing, it is to be understood that the invention is not limited to those precise embodiments, and that many various changes and modifications and variations can be effected therein by one skilled in the art without departing from the spirit and scope of the invention, as defined by the appended claims.

What is claimed is:

1. Apparatus for use with a thermal printer of the kind having a thermal head, a print medium, and a ribbon having dyes of different colors arranged between the head and the medium, wherein, upon energization of the thermal head, a selected one of said dyes is printed on the medium; said apparatus comprising:

means for multiplexing in a time-sharing manner a plurality of color data signals respectively corresponding to different ones of said dyes and producing a multiplexed color data signal having a selected color data signal arranged as an analog print signal and the remaining color data signals arranged as analog non-print signals;

analog-to-digital convertor means for converting said multiplexed color data signal into a digital multiplexed color data signal including a digital print signal corresponding to said analog print signal and digital non-print signals corresponding to said analog non-print signals;

first latch means for storing the digital print signal;

second latch means for storing a digital non-print signal;

compensation read-only memory means containing a plurality of color compensating tables associated with individual ones of said dyes in said ribbon, and connected to be addressed by output signals from said first latch means and said second latch means, said compensation read-only memory means receiving a signal indicating a dye color of said ribbon contacting said thermal head, and, in response thereto, selecting one of said plurality of color compensating tables and producing an output representing the digital print signal converted in level in accordance with said selected table;

random-access memory means receiving said output from said read-only memory means;

a gray scale counter for producing an output signal representative of a reference gray scale;

magnitude comparison means connected to receive said output from said gray scale counter and an output from said randon-access memory means for producing a gray scale adjusted output signal; and means responsive to said gray scale adjusted output signal for producing a pulse width modulated output drive signal for energizing said thermal head.

2. Apparatus according to claim 1, in which the plurality of color data signals represent a video frame formed of a plurality of rows of horizontal scans; further comprising sample-and-hold means for receiving said plurality of color data signals and producing samples thereof; whereby the picture elements of one vertical column of said rows of horizontal scans of said video picture frame are sampled.

3. Apparatus according to claim 2, in which said means for multiplexing is connected to receive a signal representing the color of dye in front of the thermal head for selecting the corresponding color data signal as the print signal and the remaining color data signals as said non-print signals and for arranging said non-print signals on either side of said print signal in a time-sharing manner.

4. Apparatus according to claim 2, in which said random-access memory means is adapted to contain a number of digital print signals corresponding to one vertical column of picture elements making up the video frame and for outputting said vertical column of digital print signals in response to a print start signal.

5. Apparatus according to claim 1, in which said compensation read-only memory means is connected to receive a temperature data signal indicating the temperature of said ribbon, and in which said compensation read-only memory means further contains temperature compensation tables one of which is selected in response to said temperature data signal, the output of said compensation read-only memory means being adjusted in response to the selected temperature compensation table.

6. Apparatus according to claim 1, in which said digital multiplexed color data signal is connected as address information to said compensation read-only memory means.

7. Apparatus according to claim 1, in which said compensation read-only memory means comprises first and second read-only memory means, said first read-only memory means containing a plurality of first converting tables associated with the dye colors of said ribbon and said non-print signals, and said second read-only memory means containing a plurality of second converting tables associated with combinations of dye colors corresponding to said non-print signals, one of said plurality of first converting tables and second converting tables being selected by said signal indicating the color of said ribbon adjacent to said thermal head.

8. Apparatus according to claim 1; further comprising third latch means; the output of said compensation read-only memory means being fed through said third latch means to said random-access memory means.

9. A color signal processing circuit for use with a color thermal printer of the kind having a thermal head, a print medium, and a ribbon having individual segments formed of different dye colors arranged therebetween for printing a color image of a video frame formed of a plurality of horizontal scan lines; said circuit comprising:

means receiving primary color data signals from said video frame and a control signal indicating the dye color of said ribbon that is adjacent said thermal head for producing a multiplexed color data signal in response to said control signal, such that the color data signal corresponding to said dye color indicated by said control signal is arranged as an analog print signal in the center with the other color data signals arranged in a time-sharing manner as analog non-print signals at the sides of said print signal;

means for converting said multiplexed color data signal into a digital multiplexed color data signal including a digital print signal corresponding to said analog print signal and digital non-print signals corresponding to said analog non-print signals;

a first latch circuit for storing the digital print signal;

a second latch circuit for storing a digital non-print signal;

compensation read-only memory means connected to be addressed outputs from said first and second latch circuits and containing a plurality of print signal level converting tables and being connected to receive an information signal indicating the dye color of said ribbon adjacent to said thermal head so that one of said plurality of level converting tables is selected for producing a level converted output signal based upon a selected table and output addresses from said first and second latch circuits;

storage means receiving said level converted output signal from said compensation read-only memory means for storing a plurality of level converted output signals constituting a vertical column of said horizontal scan lines of said video frame;

gray scale counter means; and pulse width modulation means jointly responsive to said storage means and said gray scale counter means for producing a pulse width modulated signal for energizing said thermal head.

10. A color signal processing circuit according to claim 9, in which said means receiving primary color data signals includes sample-and-hold means for producing samples of said primary color data signals in response to a sample signal, such that the picture elements of one vertical column of the horizontal scans making up the video frame are sampled.

11. A color signal processing circuit according to claim 9, in which said compensation read-only memory means is connected to receive a temperature data signal indicating the ambient temperature of said ribbon, and in which said read-only memory means further contains a plurality of temperature compensation tables one of which is selected by said temperature data signal, such that said level converted output signal of said compensation read-only memory means is adjusted in response to the selected temperature table.

12. A color signal processing circuit according to claim 9, in which said compensation read-only memory means is connected to be addressed by said digital multiplexed color data signal.

13. A color signal processing circuit according to claim 9, in which said compensation read-only memory means comprises first and second read-only memory means, said first read-only memory means containing a plurality of first converting tables associated with the dye colors of said ribbon and corresponding to said non-print signals and said second read-only memory means containing a plurality of second converting tables associated with combinations of colors corresponding to said said non-print signals, one of said first converting tables and one of said second converting tables being selected by said information signal indicating the color of said ribbon adjacent to the thermal head.

14. A color signal processing circuit according to claim 9, in which said storage means comprises a random-access memory for outputting said level converted signals in response to a print start signal.

15. A color signal processing circuit according to claim 14; further comprising a third latch circuit, the output of said compensation read-only memory means being fed through said third latch circuit to said random-access memory.

* * * * *